US010088361B2

(12) United States Patent
Fortin et al.

(10) Patent No.: US 10,088,361 B2
(45) Date of Patent: Oct. 2, 2018

(54) SMALL VOLUME HIGH EMISSIVITY INFRARED CALIBRATION SOURCE SYSTEMS AND METHODS

(71) Applicant: ABB Technology AG, Zurich (CH)

(72) Inventors: Serge Fortin, Quebec (CA); Robert Bouchard, Quebec (CA); Mathieu Maisonneuve, Quebec (CA); Frédéric Grandmont, Beaupre (CA)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/142,801

(22) Filed: Apr. 29, 2016

(65) Prior Publication Data

US 2016/0320236 A1    Nov. 3, 2016

Related U.S. Application Data

(60) Provisional application No. 62/155,797, filed on May 1, 2015.

(51) Int. Cl.

| | | |
|---|---|---|
| *G01J 3/10* | (2006.01) | |
| *G01J 3/28* | (2006.01) | |
| *B05D 5/06* | (2006.01) | |
| *B05D 7/14* | (2006.01) | |
| *B05D 3/12* | (2006.01) | |
| *B23B 5/00* | (2006.01) | |

(Continued)

(52) U.S. Cl.
CPC ............... *G01J 3/108* (2013.01); *B05D 3/12* (2013.01); *B05D 5/063* (2013.01); *B05D 7/14* (2013.01); *B23B 5/00* (2013.01); *B23B 27/14* (2013.01); *G01J 3/28* (2013.01); *G01J 5/522* (2013.01); *G02B 5/0231* (2013.01); *G02B 5/0284* (2013.01); *B23B 2226/31* (2013.01); *G01J 2005/0048* (2013.01)

(58) Field of Classification Search
CPC ..... G01J 3/108; G01J 3/28; G01J 5/522; B05D 3/12; B05D 5/063; B23B 27/14; B23B 5/00
See application file for complete search history.

(56) References Cited

U.S. PATENT DOCUMENTS

| | | |
|---|---|---|
| 4,514,639 A | 4/1985 | Bartell |
| 4,598,206 A | 7/1986 | Nelson |

(Continued)

FOREIGN PATENT DOCUMENTS

| | | |
|---|---|---|
| CA | 2734960 A1 | 2/2010 |
| DE | 2004032457 B3 | 2/2006 |

(Continued)

OTHER PUBLICATIONS

Zeh et al, "Thermal Infrared Spectrometer Mertis for the Bepicolombo Mission to Mercury", 2005.*
Kloepfer et al, "Characterization of the VIIRS Blackbody Emittance", Conference on Characterization and Radiometric Calibration for Remote Sensing, Utah State University, Space Dynamics Laboratory, Aug. 2013.*

(Continued)

*Primary Examiner* — David E Smith
(74) *Attorney, Agent, or Firm* — Taft Stettinius & Hollister LLP

(57) ABSTRACT

A blackbody surface radiator includes a surface having a plurality of adjacent grooves, each groove extending from a groove bottom to a pair of groove tops, each groove top being common with an adjacent groove, the groove bottoms and groove tops having a width of less than 100 micrometers. A mirror-like emissive coating covers the surface.

17 Claims, 2 Drawing Sheets

(51) Int. Cl.
*B23B 27/14* (2006.01)
*G01J 5/52* (2006.01)
*G02B 5/02* (2006.01)
*G01J 5/00* (2006.01)

(56) References Cited

U.S. PATENT DOCUMENTS 4,672,211 A 6/1987 Bartell
6,447,160 B1 9/2002 Fraden

FOREIGN PATENT DOCUMENTS

DE 2010010337 U1 11/2010
EP 2205951 B1 11/2011

OTHER PUBLICATIONS

Prokorov et al, "Radiation Properties of IR Calibrators with V-grooved Surfaces", Thermosense XXVII, Proc. of SPIE 6205, 2006.*
S. Schieding, et al., "Compact Blackbody Calibration Sources for In-Flight Calibration of Spaceborne Infrared Instruments", 2014 International Conference on Space Optics (ICSO), Oct. 7-10, 2014, 8 pages, Tenerife, Canary Islands Spain.
A. Prokhorov, et al., "Radiation Properties of IR Calibrators With V-Grooved Surfaces", 2006, 9 pages, Proc. of SPIE vol. 6205.
J. Kloepfer, et al., "Characterization of the VIIRS Blackbody Emittance", Aug. 2013, 14 pages.
T. Zeh, et al., "Thermal Infrared Spectrometer Mertis for the Bepicolumbo Mission to Mercury", 2005, 5 pages.

* cited by examiner

SMALL VOLUME HIGH EMISSIVITY INFRARED CALIBRATION SOURCE SYSTEMS AND METHODS

RELATED APPLICATIONS

The present application claims the benefit of U.S. Provisional Patent Application No. 62/155,797 which is incorporated herein by reference.

TECHNICAL FIELD

The present disclosure concerns infrared calibration sources, and in particular small volume high emissivity infrared calibration sources.

BACKGROUND

Blackbody calibration sources permit calibration of infrared detection equipment. While a cavity-shaped calibrator at thermal equilibrium having an aperture can make an excellent approximation of an ideal blackbody, such cavity-based blackbodies can be excessively large and heavy for certain applications, such as orbital infrared spectrometers. Surface blackbody infrared calibration sources can achieve some desired physical attributes, e.g., for space-borne applications, that cavity blackbodies cannot, such as reduced size and weight. However, some existing systems have various shortcomings relative to certain applications. For example, existing surface blackbody calibration sources may not have as high an emissivity as cavity-based calibration radiators. Accordingly, there remains a need for further contributions in this area of technology.

SUMMARY

Embodiments of the present invention include a blackbody surface radiator that includes a surface having a plurality of adjacent grooves, each groove extending from a groove bottom to a pair of groove tops, each groove top being common with an adjacent groove, the groove bottoms and groove tops having a width of less than 100 micrometers. A mirror-like emissive coating covers the surface. Further embodiments, forms, features, aspects, benefits, and advantages of the present application shall become apparent from the description and figures provided herewith.

BRIEF DESCRIPTION OF THE FIGURES

In the accompanying drawings, structures and methods are illustrated that, together with the detailed description provided below, describe aspects of systems and methods concerning small volume high emissivity infrared calibration sources. It is noted that a single component may be designed as multiple components or that multiple components may be designed as a single component.

Further, in the accompanying drawings and description that follow, like parts are indicated throughout the drawings and written description with the same reference numerals, respectively. The figures are not drawn to scale and the sizes of certain parts have been exaggerated for convenience of illustration.

FIGS. 3A and 3B illustrate enlarged views of some aspects of non-limiting examples of grooves in accordance with an embodiment of the present invention.

DETAILED DESCRIPTION OF THE ILLUSTRATIVE EMBODIMENTS

Figure 1:
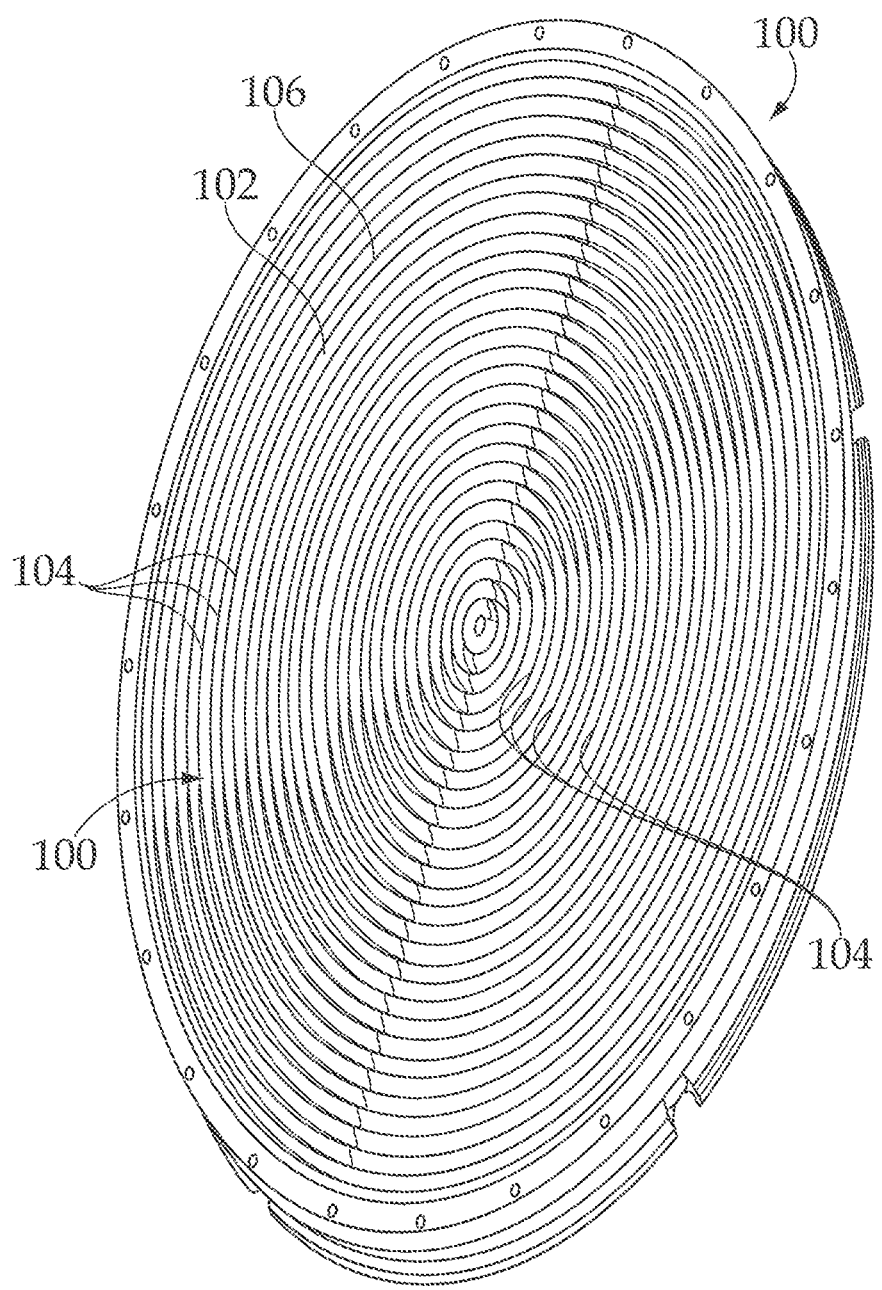
FIG. 1 illustrates a perspective view of some aspects of a non-limiting example of a blackbody radiator in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, some aspects of a non-limiting example of a surface black body radiator 100 in accordance with an embodiment of the present invention are illustrated. Blackbody radiator 100 includes a grooved surface 102. The grooved surface 102 includes a plurality of adjacent grooves formed in a substrate, e.g., twenty eight concentric grooves 104 of about equal depth and positioned adjacent to each other in the illustrated embodiment. While the grooves 104 shown in FIG. 1 are V-shaped, groove shape according to the present teachings is not limited to V-shaped grooves, and without limitation such grooves 104 can have different shapes such as a sawtooth shape, a curved V-shape having walls that are convex, concave, or a mixture of convex or concave shapes, or other geometries allowing light trapping. In addition, a radiator 100 according to the present teachings is not limited to twenty-eight grooves 104, and can have more or less grooves 104 than in the depicted radiator 100. Furthermore, the grooves 104 can vary in depth and shape from groove 104 to groove 104, and from one location in a particular groove 104 to another location in the groove 104. For example, the angle between the walls forming the groove can vary for different locations on the radiator 100. While the depicted grooves 104 are circular, and are arranged concentrically, other contours are permitted according to the present teachings, include linear grooves, such as parallel rectilinear grooves, intersecting grooves, and other geometries. While radiator 100 is machined from aluminum, a radiator 100 according to the present teachings can also be formed from other materials, including other metals such as steel or various alloys.

The surface 102 is covered by an emissive coating material 106, e.g., a light-absorbing coating material, configured to provide a high surface emissivity. In one form, emissive coating material 106 is a coating that does not negatively alter the specular quality of the machined or otherwise formed walls of grooves 104, although in various embodiments, any suitable coating material may be used. In one form, coating material 106 does not possess a strong capillarity property such as would result in the application of the coating effectively increasing the width of the grooves 104 tops and bottoms from the as-formed state and/or adversely affecting surface roughness of grooves 104, e.g., reducing the specular quality of the groove walls. According to one aspect of the present teachings, the coating material 106 in the as-applied condition yields a highly specular or mirror-like emissive coating, which mirror-like coating can allow for greater specular reflection of incident radiation relative to diffusive coatings. As an infrared calibration radiator, a "mirror-like" surface as that term is used herein is a surface that provides high specular reflection in the infrared spectrum. In one form, a surface that provides high specular reflection yields less than about 15%-20% total integrated scatter (greater than about 80%-85% specular reflection) in the infrared spectrum. In other embodiments, the degree of specular reflection may vary with the needs of the application. In one form, the surface is mirror-like in the infrared spectrum in the range of about 1 micron (micrometer) to about 50 microns in wavelength. In other embodiments, the surface may be mirror-like in the infrared spectrum in the range of about 0.4 microns to about 50 microns in wavelength. In still other embodiments, the surface may be mirror-like in any wavelength range in the infrared spectrum generally.

A support (not shown) is fastened around the radiator 100 and can have features used to mount the radiator 100 to instrumentation. The radiator 100 has a circumference of about 30 centimeters, although larger or smaller sizes can be implemented according to the present teachings.

Figure 2:
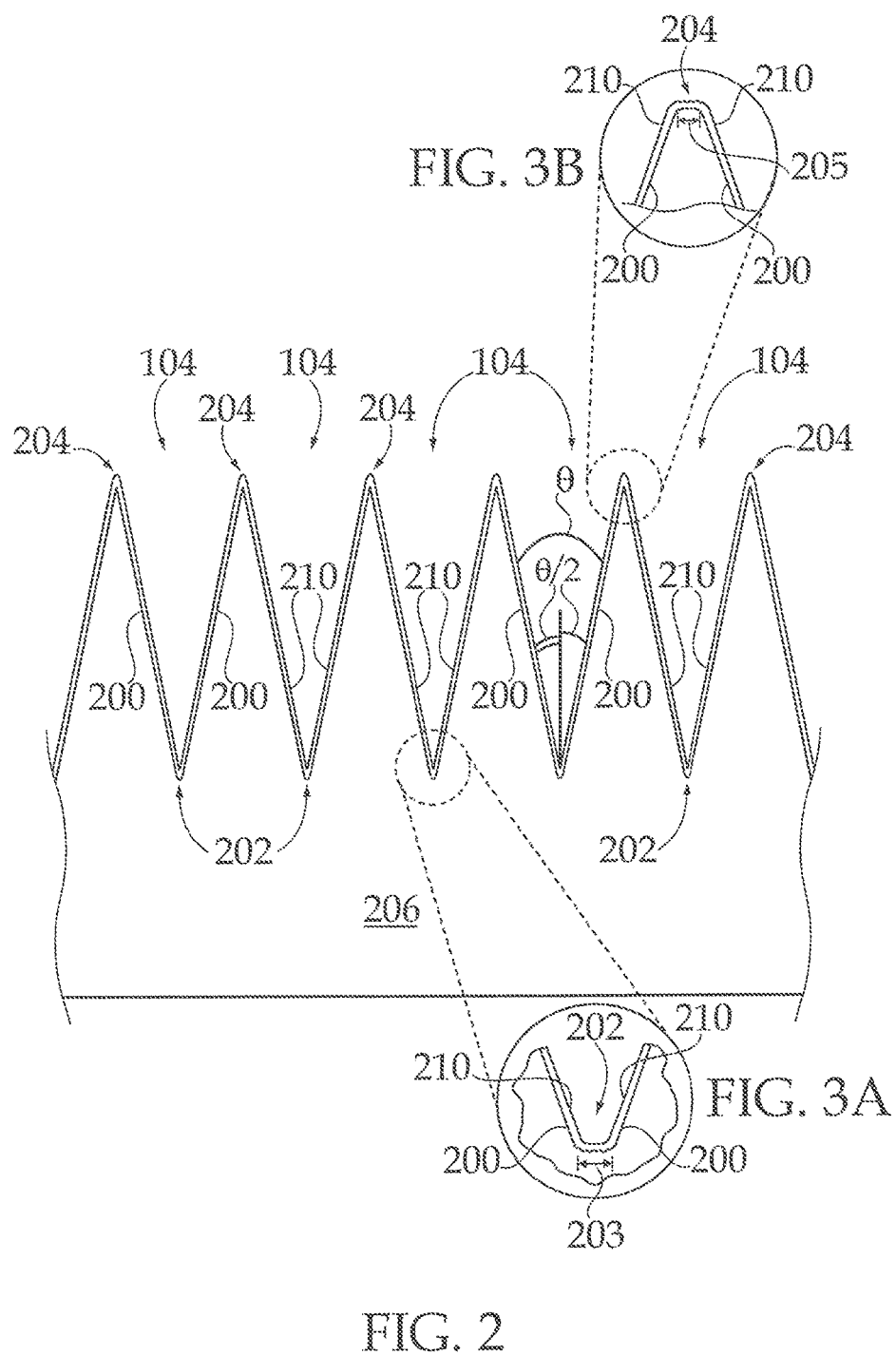
FIG. 2 illustrates a cross sectional view of some aspects of a non-limiting example of a grooved surface in accordance with an embodiment of the present invention.

With reference to FIG. 2 and FIGS. 3A and 3B, each groove 104 is defined, in part, by two walls 200 extending from a groove bottom 202 to one of two tops 204, each top of which, e.g., as shown in FIG. 2, is positioned between adjacent grooves 104, and shared by or common with an adjacent groove 104. According to one aspect of the present teachings, the walls 200 of the grooves 104 are machined from a solid substrate 206 using diamond tooling. Machining with diamond tooling can also be referred to herein as "diamond machining." A diamond machining process, such as diamond turning, removes material and also forms a mirror-like surface on walls 200. After diamond machining to form a mirror-like surface on walls 200, an emissive specular coating, e.g., coating material 106, is applied to the radiator, covering the groove walls 200, bottoms 202 and tops 204, and forming a coating 210 that maintains the specular character of the reflection offered by the walls 200 underlying the coating 210. In one form, coating 210 is a high emissivity coating, i.e., a coating having an emissivity of at least 0.8. In other embodiments, the emissivity of coating 210 may vary with the needs of the application. For example, in embodiments wherein the angle between groove walls 200 is more obtuse, less reflections between groove walls will be generated, in which case, it may be desirable to use a coating having an emissivity substantially greater than 0.8 or 80%, e.g., up to about 99.9% or greater in some in some embodiments. In embodiments wherein the angle between groove walls is more acute, e.g., 45° or less, the number of reflections off groove walls 200 increases, absorbing more reflected light, and hence a lower degree of emissivity may be sufficient to render the total emissivity of radiator 100 suitable for the application, e.g., a coating having 80% emissivity or greater.

The depicted grooves 104 have about the same depth as measured from the tops 204 to the bottoms 202. The groove walls 200 are separated by a common angle $\ominus$, as measured by the angle between one wall 200 and an adjacent wall 200 corresponding to two geometric segments joined at the groove bottom 202. While the grooves 104 of the radiator 100 are shown in the Figures to have about the same angle between respective groove walls 200 as one another, in other embodiments, some grooves 104 can have walls 200 separated by different angles than other grooves 104. In various embodiments, the walls 200 of a particular groove 104 can be angularly displaced from the vertical direction by the same amount, such as depicted in FIG. 2, where the walls 200 are both displaced from the vertical direction by the same angle $\ominus/2$, or by a different amount, e.g., where one wall 200 of a particular groove 104 is displaced from the vertical by a first angle, and the other wall 200 is displaced by a second angle from the vertical that is different than the first angle.

High emissivity may be achieved by a combination of high surface emissivity and a high number of reflections. The number of reflections increases with decreasing groove angle $\ominus$, and is also increased by making the reflections highly directional, e.g., specular reflections. According to one aspect of the present teachings, the groove walls 200 can be separated by an angle $\ominus$ of less than or equal to about 90 degrees. According to another aspect of the present teachings, the groove walls 200 can be separated by a more acute $\ominus$ angles of less than or equal to about 75 degrees, less than or equal to about 50 degrees, less than or equal to about 45 degrees, or less than or equal to about 30 degrees.

In some embodiments, the minimum groove angle corresponding to the maximum number of grooves for a given area is limited by the groove top and groove bottom edge area or width for which the number of reflections is reduced to one. Higher emissivity is obtained by the use of groove walls having a mirror-like finish and sharp edges at the groove tops and bottoms. In the illustrated embodiment, tops 204 and bottoms 202 are narrow and have fine tolerances, which is permitted by a diamond machining process, such as diamond turning. In one form, the tops 204 and bottoms 202 have sharp edges defined by widths 203 and 205 less than about 50 microns. In other embodiments, the tops 204 and bottoms 202 may have sharp edges defined by widths 203 and 205 of any value between about 0.1 to 100 microns, inclusive. In one form, the aforementioned dimensions of widths 203 and 205 apply to surface 102 in the machined condition or state, that is, prior to the application of the high emissivity coating 106. In other embodiments, the aforementioned dimensions of widths 203 and 205 may apply to surface 102 after the application of the high emissivity coating 106. Manufacturing processes other than diamond turning or other diamond machining processes may also or alternatively be used to form grooves having mirror-like walls 200 and sufficiently sharp or narrow tops 204 and bottoms 202 defined by respective widths 205 and 203, including but not limited to mechanical slurring, electro-erosion, machining combined with surface polishing, and microfabrication including 3-dimensional printing, or other additive or subtractive manufacturing approaches.

In one form, grooves 104 are formed in substrate 206 with mirror-like walls prior to coating. According to one aspect of the present teachings, the surface roughness of diamond machined walls 200, prior to deposit of coating 210, can be less than 200 nanometers as measured by the average peak to trough height of the surface over a sample region of the walls 200, which in some embodiments is a mirror-like finish that provides high specular reflection in the desired infrared spectrum. In other embodiments, the pre-coated finish of walls 200 may have a mirror-like finish in the form of an average peak to trough roughness in the range of 50 nanometers to 250 nanometers or less. As used herein, "roughness" will be understood to refer to average peak to trough height of a surface over a sample region of the surface. In addition, the mirror-like surfaces of the walls 200 can be formed by polishing the walls 200.

The mirror-like high emissivity coating 210 can be, but is not limited to, commercially available coatings such as "dark gold," "copper blackening" available from Electrum of Vaudreuil-Dorion, Canada, or "Fractal Black" and other, e.g., thinner, coatings available from Acktar of Kiryat-Gat, Israel. These coatings can be applied through vapor deposition techniques, which minimizes or eliminates capillary effects that may otherwise be present, for example, if using sprayed coatings. In one form, coating 210 thickness is in the range of about 10 microns to about 16 microns. In other embodiments, coating 210 thickness is in the range of about 10 microns to about 20 microns. In still other embodiments, the coating 210 thickness may be up to or greater than about 50 microns, and in yet other embodiments, the coating thickness may vary with the needs of the application.

The mirror-like surface formed on walls 200 and mirror-like coating 210 deposited on the walls 200 permits radiation on radiator 100 to exhibit greater specular reflection behavior and less diffusive reflection, or refractive, behavior common to emissive coatings that are not mirror-like coatings. With each reflection of incident radiation, a portion of the incident light is captured as heat energy in the radiator 100.

Embodiments of the present invention include a blackbody surface radiator comprising: a surface having a plurality of adjacent grooves, each groove extending from a groove bottom to a pair of groove tops, each groove top being common with an adjacent groove, the groove bottoms and groove tops having a width of less than 100 micrometers; and, a mirror-like emissive coating covering the surface.

In a refinement, the plurality of grooves are concentric.

In another refinement, the plurality of grooves are defined at least in part by a first wall and a second wall, the first wall and the second wall extending from the groove bottom to a corresponding one of the groove tops.

In yet another refinement, the first wall and the second wall have a roughness of less than 200 nanometers average peak to trough height.

In still another refinement, an angle between the groove walls is equal to or less than about 90 degrees.

In yet still another refinement, an angle between the groove walls is equal to or less than about 45 degrees.

In a further refinement, an angle between the groove walls is equal to or less than about 30 degrees.

In a yet further refinement, the groove bottoms and groove tops have a width of less than 20 micrometers.

In a still further refinement, the grooves are V-shaped.

Embodiments of the present invention include a method for manufacturing a blackbody surface radiator, comprising: machining a plurality of grooves on a substrate with diamond tooling; and applying a mirror-like emissive coating to the grooves.

In a refinement, the machining includes machining first and second walls of the grooves.

In another refinement, the machining step includes machining a mirror-like surface on the first and second walls.

In yet another refinement, the applying step includes applying a mirror-like emissive coating on the first and second walls.

In still another refinement, the machining step includes machining first and second walls of the grooves, wherein the first and second walls are disposed less than about 50 degrees apart.

Embodiments of the present invention include an infrared calibration radiator, comprising: a substrate; a plurality of adjacent grooves formed in the substrate, each groove having a first wall and a second wall opposite the first wall, wherein the first wall and the second wall extend from a common groove bottom to respective groove tops common with adjacent grooves; wherein the groove bottoms and groove tops have a width less than about 100 microns; and wherein each groove wall is constructed to provide high specular reflection; and a coating disposed over the groove walls, wherein the coating is configured to provide high specular reflection.

In a refinement, the groove bottoms and/or the groove tops have a width less than about 50 microns.

In another refinement, the groove bottoms and/or the groove tops have a width less than about 50 microns in the as-formed condition of the grooves.

In yet another refinement, the groove walls are mirror like.

In still another refinement, the coating is a high emissivity coating.

In yet still another refinement, the groove walls in a coated condition and/or an uncoated condition have a surface roughness of 50-250 average peak to trough height or less.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A blackbody surface radiator comprising:
   a surface having a plurality of adjacent grooves, each groove extending from a groove bottom to a pair of groove tops, each groove top being common with an adjacent groove, the groove bottoms and groove tops having a width of less than 100 micrometers, wherein the plurality of grooves are defined at least in part by a first wall and a second wall, wherein the first wall and the second wall have a roughness of less than 250 nanometers average peak to trough height; and,
   a mirror-like emissive coating covering the surface.

2. The radiator of claim 1, wherein the plurality of grooves are concentric.

3. The radiator of claim 1, wherein the first wall and the second wall extending from the groove bottom to a corresponding one of the groove tops.

4. The radiator of claim 3, wherein an angle between the groove walls is equal to or less than about 90 degrees.

5. The radiator of claim 4, wherein an angle between the groove walls is equal to or less than about 45 degrees.

6. The radiator of claim 4, wherein an angle between the groove walls is equal to or less than about 30 degrees.

7. The radiator of claim 1, wherein the groove bottoms and groove tops have a width of less than 20 micrometers.

8. The radiator of claim 1, wherein the grooves are V-shaped.

9. A method for manufacturing a blackbody surface radiator, comprising:
  machining a plurality of grooves on a substrate with diamond tooling in which the machining includes machining first and second walls of the grooves, each of the first and second walls having roughness of less than 250 nanometers average peak to trough height; and,
  applying a mirror-like emissive coating to the grooves.

10. The method of claim 9, wherein the machining step includes machining a mirror-like surface on the first and second walls.

11. The method of claim 10, wherein the applying step includes applying a mirror-like emissive coating on the first and second walls.

12. The method of claim 9, wherein the first and second walls are disposed less than about 50 degrees apart.

13. An infrared calibration radiator, comprising:
  a substrate;
  a plurality of adjacent grooves formed in the substrate, each groove having a first wall and a second wall opposite the first wall, wherein the first wall and the second wall extend from a common groove bottom to respective groove tops common with adjacent grooves, wherein the groove walls in a coated condition and/or an uncoated condition have a surface roughness of 50-250 nanometers average peak to trough height or less, wherein the groove bottoms and groove tops have a width less than about 100 microns; and wherein each groove wall is constructed to provide high specular reflection; and
  a coating disposed over the groove walls, wherein the coating is configured to provide high specular reflection.

14. The infrared calibration radiator of claim 13, wherein the groove bottoms and/or the groove tops have a width less than about 50 microns.

15. The infrared calibration radiator of claim 14, wherein the groove bottoms and/or the groove tops have a width less than about 50 microns in the as-formed condition of the grooves.

16. The infrared calibration radiator of claim 14, wherein the groove walls are mirror like.

17. The infrared calibration radiator of claim 14, wherein the coating is a high emissivity coating.

\* \* \* \* \*